United States Patent [19]
Remond

[11] Patent Number: 5,660,677
[45] Date of Patent: Aug. 26, 1997

[54] APPARATUS FOR THE BUILDING OF TIRES USING A CLAMPED TURN-UP BLADDER

[75] Inventor: Michel Remond, Riom, France

[73] Assignee: Compagnie Generale des Etablissements Michelin - Michelin & Cie, Clermont-Ferrand Cedex, France

[21] Appl. No.: 546,380

[22] Filed: Oct. 20, 1995

Related U.S. Application Data

[62] Division of Ser. No. 283,285, Jul. 29, 1994, Pat. No. 5,500,066.

[30] Foreign Application Priority Data

Aug. 4, 1993 [FR] France .................. 93/09697

[51] Int. Cl.⁶ ........................... B29D 30/32
[52] U.S. Cl. ........................... 156/401; 156/400
[58] Field of Search ................ 156/400, 401, 156/403, 132, 133, 123, 130.7, 135

[56] References Cited

U.S. PATENT DOCUMENTS

| 2,435,345 | 2/1948 | Freyssinet . | |
|---|---|---|---|
| 3,053,308 | 9/1962 | Vanzo et al. | 156/132 |
| 3,173,821 | 3/1965 | Trevaskis . | |
| 3,418,192 | 12/1968 | Nädler . | |
| 3,434,897 | 3/1969 | Caretta et al. | 156/132 |
| 3,490,980 | 1/1970 | Mallory et al. | 156/132 |
| 3,616,059 | 10/1971 | Frazier | 156/401 |
| 3,740,293 | 6/1973 | Jones et al. | 156/132 |
| 3,776,793 | 12/1973 | Frazier . | |
| 3,784,426 | 1/1974 | Woodhall et al. . | |
| 4,199,393 | 4/1980 | Brown et al. . | |
| 4,226,656 | 10/1980 | Appleby et al. | 156/132 |
| 4,683,021 | 7/1987 | Stalter et al. . | |
| 5,071,498 | 12/1991 | Nishide et al. | 156/132 |

FOREIGN PATENT DOCUMENTS

| 1485919 | 5/1967 | France . | |
|---|---|---|---|
| 1532035 | 7/1967 | France . | |
| 1502282 | 10/1967 | France . | |
| 1521439 | 3/1968 | France . | |
| 1276329 | 8/1968 | Germany . | |
| 1729584 | 7/1971 | Germany . | |
| 846244 | 8/1960 | United Kingdom | 156/132 |

OTHER PUBLICATIONS

Database WPI Week 8512, Derwent Publications Ltd., London, GB; AN 85-071631 & JP-A-60 025 737 Yokohama Rubber K.K.) 8 Feb. 1985 abrege et. fig. 2-6.

Primary Examiner—Geoffrey L. Knable
Attorney, Agent, or Firm—Brumbaugh, Graves, Donohue & Raymond

[57] ABSTRACT

The present invention concerns a tire-building process in which a so-called "shaping" building drum is used and in which a ply turn-up bladder (2) is clamped on the outside of each bead recess (6) by an assembly of pallets (11) which can open in fan shape and cover the turn-up bladder completely in circumferential direction and in part in axial direction. The axial displacement of the said pallets (11), controlled by the axial displacements of two pistons (7) and (8), makes it possible to modify the shape of the ply turn-up bladder (2).

11 Claims, 6 Drawing Sheets

1

APPARATUS FOR THE BUILDING OF TIRES USING A CLAMPED TURN-UP BLADDER

This application is a division of application Ser. No. 08/283,285, filed on Jul. 29, 1994, now U.S. Pat. No. 5,500,066.

BACKGROUND OF THE INVENTION

The present invention relates to the manufacture of tires. More particularly, it concerns the assembling of tires on a drum.

In this field, so-called "shaping" drums, in particular, are known, that is to say drums having means which permit the bringing together of the bead recesses of the tire which are provided on the drum, used together with means for effecting a radial expansion of all or part of the tire blank produced on said drum.

In a first stage of the manufacture of a tire on a drum of this type, a quasi-cylindrical carcass sleeve is produced by winding onto the outer surface of the drum, in the order required by the structure of said tire, numerous semifinished products comprising either mixes having a base of unvulcanized rubber or reinforcement elements such as cords or cables coated with mixes having a base of unvulcanized rubber, generally prepared in the form of plies.

After having put the bead wires of the tire in place on the sleeve, facing the bead recesses provided in the building drum, parts of the sleeve which are located radially below the bead wires are expanded radially until said parts are blocked below the bead wires. The portion of the sleeve located between the bead recesses is then deformed in order to obtain a toroidal shape, while axially bringing the said recesses towards each other. The clamping of the sleeve under the bead wires must be sufficient to prevent any relative displacement of the sleeve with respect to the bead wires during this operation.

This radial deformation is obtained, for instance, by the inflating of a rubber bladder surrounding the building drum between the axially innermost bead recesses and permitting the laying of the products forming the tire on the quasi-cylindrical outer surface of said bladder when it is deflated.

Almost simultaneously with this second stage, the portions of the sleeve which are furthest axially to the outside are themselves also expanded radially towards the outside by the use of means forming part of the building drum and are progressively applied against the expanded portion of the sleeve located between the bead recesses. This operation, during which the beads are first formed and then the sidewalls of the tire, is known as "turning-up".

U.S. Pat. No. 4,683,021 describes a tire-building drum in which the turning-up of the portions of the sleeve furthest axially to the outside is effected by the inflating of a first bladder of reduced dimensions for the forming of the beads, followed by the inflating of a second bladder which surrounds the first and is of much larger dimensions in order to form the sidewalls of the tire up to the points of said tires furthest radially to the outside; furthermore, another bladder is provided which is located axially to the outside of the two preceding ones in order to be able to effect the putting in place of the portion of the sidewall which is radially outermost by exerting an inwardly directed axial push on each of the turn-up bladders.

However, such a process does not assure an excellent production of the beads since the turn-up bladder, although of small dimensions, cannot produce an axial force sufficient to avoid the formation of air pockets in said beads, which can prove harmful with respect to the overall strength of the tire during its subsequent use; furthermore, the operation of the turning-up of the rubber-base products constituting the sidewalls of the tire requires the use of bladders of such dimensions that, once inflated, said bladders have their radially furthest points from the axis of symmetry of the building drum located on a radius at least equal to that of the points of the sidewalls of the tire which are furthest radially to the outside. Because of this, it results that the products which have been placed on this bladder in its deflated state will have a tendency to slide radially towards the inside and towards the beads during the turning-up phase, since they are entirely on the same side of the inflated bladder with respect to the radially outermost point of said bladder. There results from this an extensive dispersion of the heights of the products placed on the sidewalls of the tire and possibly the formation of folds, with an unfavorable effect on the overall strength of said tire.

U.S. Pat. No. 2,435,345 teaches that a single turn-up bladder at each end of the building drum can be used in order to form the beads and the sidewalls of the tire simultaneously, provided that means permitting the exerting of an axial thrust on said bladders is added to each of these bladders. We may note that each outside bladder, as a result of its shape, does not permit, any more than in the previously cited patent, a good holding of the products to be turned-up up to the zone of connection with the crown of the tire; finally, the said axial thrust means lead to an additional space requirement which is particularly disturbing in an industrial context.

SUMMARY OF THE INVENTION

The object of the present invention is to improve the technique for the turning-up of the products arranged in a first step on the quasi-cylindrical surface, which is present on a building drum, in order to permit the said products to be placed with precision on the tire.

In accordance with the invention, the process for the building of a tire having reinforced beads comprises the following steps:

the use of a shaping building drum equipped at each of its ends with at least one ply turn-up bladder extending axially beyond recesses which receive the beads of the tire, arranging or producing on said drum a quasi-cylindrical sleeve constituting the blank of a carcass having the bead reinforcements, radially expanding the portion of the sleeve located between the bead recesses while bringing the bead recesses together in order to impart a substantially toroidal shape to said portion of the sleeve, defining a useful surface on at least one radially outer wall of the turn-up bladder, between the axially inner edge thereof, located at the level of the recess of the beads, and clamping means applied on said bladder at least along a clamping circle of variable diameter concentric to the drum, so as to create a provisional support for the bladder, clamping it at a preselected place of said bladder in the meridian direction, inflating the turn-up bladder and imposing upon said clamping means a combination of axial and radial movements in order to continuously and permanently control the shape and deformation of said useful surface between the provisional support of the bladder on the clamping means, which is immovable in the meridian direction with respect to the surface of the bladder, and the inner edge of said bladder so that said useful surface forms an annular dome or bulge protruding radially at a higher level than said clamping circle, for every axial position of the said clamping circle along the useful course thereof and to thus produce a correct turning-up.

By "useful surface", there is to be understood a portion only of the radially outer wall of the turn-up bladder located axially to the outside of the bead recesses and on which the products of the sleeve which are furthest axially to the outside can be placed; the portion of the bladder corresponding to said useful surface is limited axially towards the outside by the clamping circle. This useful surface assures the radial expansion of the said products and the placing of them on the shaped portion of the sleeve located between the beads.

The useful portion of the course of the clamping circle corresponds to the greatest portion of said course, in particular as long as the turned-up product still remains resting on said bladder for a non-negligible fraction of the said product from a weight standpoint.

By means of a combination of radial and axial displacements of the clamping means of the turn-up bladder, one can compel the radius of curvature of the meridian profile of said bladder, taken at the point furthest radially to the outside, to decrease constantly while the point of tangency of the bladder with the portion of the sleeve axially to the inside of the bead recesses moves radially towards the outside so as to progressively apply the turned-up products against the said portion of the sleeve.

The said combination of radial and axial displacements of the clamping means of the turn-up bladder is controlled in such a manner that the ends furthest axially to the outside of the products to be turned-up are, for the greatest part of the turn-up operation, located on a circle of a radius less than the distance to the axis of the point of the bladder located furthest radially to the outside. By greatest part of the turn-up operation there is understood practically the entire operation, except possibly the end of said operation since, at that time, the weight of the products supported solely by the bladder which are not yet adhered to the blank become sufficiently slight so that one no longer fears the undesirable effects explained above, and which are present in the prior art.

By the present invention, the portions of the sleeve located axially to the outside of the bead recesses can be turned-up and applied against the portion of the sleeve located axially between the bead recesses in order in this way to form the beads, with the avoidance of the inclusion of air pockets between the different products constituting the said beads.

Furthermore, in accordance with the invention, the portions of the sleeve located axially to the outside of the bead recesses can be turned-up and applied against the shaped portion of the sleeve located axially between the bead recesses up to the point furthest radially to the outside of the said portion of the sleeve located between the bead recesses. In accordance with the invention, a force of axial and radial components can be exerted permanently and continuously on the portions of the carcass sleeve which are expanded radially and located axially to the outside of the bead recesses and thus effect a progressive turning-up extending from the zone close to the beads to the top zone of the sidewalls, while avoiding radial sliding towards the inside of the products constituting the sidewall.

Furthermore, the method of the invention makes it possible to exert a force of axial and radial components of variable intensity, which can be adjusted at will, throughout the manufacturing cycle of the tire on the expanded portions of the sleeve, axially to the outside of the bead recesses.

Another advantage of the present invention resides in the fact that, after having deflated a turn-up bladder so that the useful surface of said bladder resumes a quasi-cylindrical configuration, it is possible to place new components on the outer surface of the said bladder and then to turn them up, using the method forming the object of the invention. In particular, products formed of different rubber mixes not reinforced by fibers or cables can easily be turned-up without there being any sliding of the said products radially towards the inside along the turn-up bladder once the bladder is inflated.

Another object of the present invention is to provide a tire building machine which employs such a process. Said tire building machine comprises two cylindrical half-drums which are concentric and movable axially with respect to each other, each covered at the ends furthest away axially by at least one annular bladder, said bladder forming, with zero pressure, a quasi-cylindrical outer surface on which the different components of the tire are placed, comprising a means for blocking the tires radially which is located below recesses receiving the beads, characterized by the fact that it comprises:

clamping means associated with the turn-up bladder, axially to the outside of the recess receiving the bead, the said clamping means acting on at least one clamping circle of variable diameter which is concentric to the drum, clamping said bladder at a preselected place thereof in the meridian direction, and defining a useful surface on the radially outer wall of the said bladder between the axially inner edge thereof located at the level of the recess of the beads and the said clamping means, means for preventing the meridian sliding of the turn-up bladder with respect to the clamping means, drive means making it possible to impose any combination of axial and radial displacements on said clamping means so as to permanently control the axial and radial positions of the points of rest of the turn-up bladder on the said clamping means.

DESCRIPTION OF DRAWINGS

The figures of the accompanying drawing illustrate in non-limitative fashion one embodiment of the invention and make it possible to understand the principle and advantages of the invention.

DESCRIPTION OF PREFERRED EMBODIMENTS

In accordance with the invention, the process makes it possible to define a useful surface on a portion of the outer wall of the turn-up bladder and also to permanently impose the shape of the inflated profile of this useful surface with the aid of clamping means acting on at least one circle which is concentric to the drum, so as better to control the turning-up of the portions of the sleeve which are axially outside the bead recesses.

Figure 1:
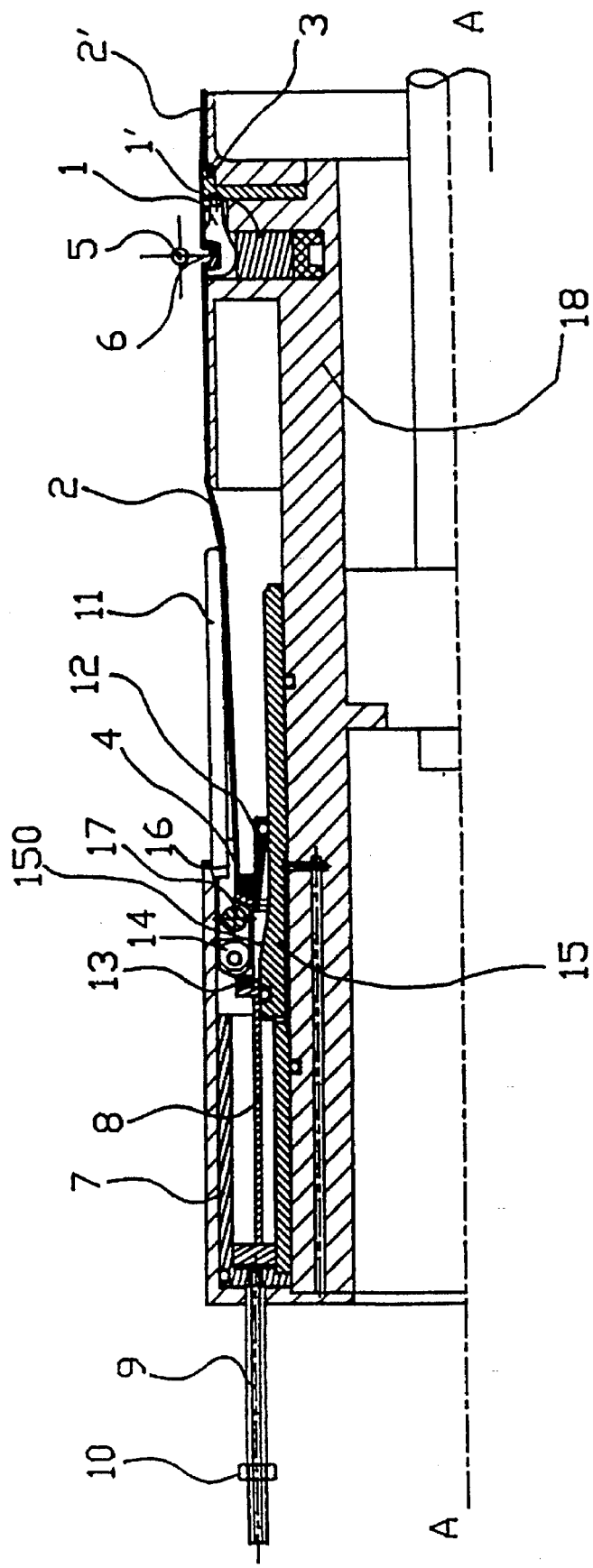
FIGS. 1, 2 and 3 are longitudinal sections through half of a tire manufacturing machine developed in accordance with the invention, in different phases of the turning-up.

FIG. 1 shows, in initial position of rest, a partial axial section through a tire building machine which permits the carrying out of the process in accordance with the invention. Said machine preferably comprises two building half-drums having the axis of rotation A—A; each half drum is borne by a frame 18 which is capable of moving on a central shaft of axis AA. A device, not shown, permits symmetrical movement of these two half drums along the central shaft.

Each of these two half drums comprises an annular bladder having two parts 2 and 2', the outer wall of which serves as resting surface for the different components of the carcass sleeve and the region of connection between the two parts at a bead recess 6; this recess has the function of receiving a tire bead and of defining the portion 2 of the bladder axially to the outside of the bead recess 6 and the portion 2' of the same bladder axially to the inside of said recess.

In the present case, this bladder is made of a rubber-base mix reinforced by reinforcements of cord or cable type which are oriented in radial direction.

The end 3 of said bladder is anchored on the frame 18 axially to the inside of the bead recess 6, while the other end 4 axially to the outside of the bead recess 6 is fastened on a ring 12 which is concentric with the frame of the drum 18 and movable with respect to said frame 18. Radially below the bead recess 6 there are arranged means 1 which assure the axial positioning of the said recess 6 and means 1' which assure the radial expansion which makes it possible to effect a radial expanding of the sleeve until the said sleeve is radially blocked on at least one bead wire 5.

Each turn-up bladder 2 is acted on by clamping means which comprise an assembly of metal pallets 11 capable of opening in fan or expanding conical shape and covering the said bladder 2 completely in its circumferential direction (see FIG. 4), even in expanded state, and only in part in axial direction, starting from the end 4 furthest from the outside of the said bladder.

The "useful surface" of the bladder 2 corresponds to the portion of said bladder not covered by the assembly of pallets 11 and extending between the axially innermost end of the pallets 11 and the bead recess 6.

On each half drum, the pallets 11 are connected to a ring 13 concentric to the frame 18 and movable axially with respect to said frame 18, driving the pallets 11 with it. The said ring 13 is integral with the ring 12 in its axial displacements. In this way, the end 4 of the bladder 2 follows the axial movements imposed upon the pallets 11, via the ring 13, without the possibility of slippage in the meridian direction of said bladder 2 with respect to said pallets 11.

In the embodiment described here, each pallet 11 is fastened on a lever 16 which is movable in rotation around a point of articulation 17 on the ring 13, the said lever 16 being in contact with a cam 15 of suitable profile. In the present case, this contact takes place via a roller 14 provided on the axially outermost end of each lever 16. Said cam 15 is provided on its radially outer face with a ramp 150 concentric to the frame 18 and movable with respect to the frame 18.

Under the effect of a pressure within the bladder 2, the pallets 11 open up radially and drive the levers 16 in rotation around the articulation 17 until the rollers 14 come into contact with the ramp 150. For a fixed angle of opening of the pallets, the axial component of the force acting on the products to be turned up can be varied by modifying the axial position of the pallets 11 and thus the shape of the useful surface of the bladder 2; the deformation imposed upon the bladder 2 by the pallets 11 is modified by displacing the ring 13, on which the pallets 11 are fastened, with respect to the ramp 150.

In the present case, the machine in accordance with the invention comprises, at each of its axially outermost ends, two concentric annular pistons 7 and 8 (seen in radial section in FIGS. 1 to 3) which can move axially with respect to the frame 18. The piston 8, which is connected at its axially innermost end to the rings 12 and 13, makes it possible to displace axially both the pallets 11 and the end 4 of the turn-up bladder 2 with respect to the bead recess 6. By actuating the piston 8, it is possible to effect the axial displacement of the ring 13 bearing the pallets 11 relative to the ramp 150. The piston 7, the stroke of which is adjustable and is limited by the nut 10 locked on the threaded rod 9, drives, in its axial movement, the piston 8 and the ramp 150.

The movement of rotation of the pallets 11 produced by the inflation of the bladder 2 is a function both of the axial displacements of the ring 13 relative to the ramp 150 and of the profile of the ramp 150 on which the points of contact of the levers 16 move. The profile of the radially outermost generatrix of this ramp 150 is such that, under the effect of an axial displacement of the ring 13 relative to the ramp 150, the roller 14, following the profile of said ramp 150, establishes a precise control over the radial opening of the levers 16 and therefore of the pallets 11.

The machine described also comprises means—not shown here—which permit the bringing together of the two half drums simultaneously with the axial displacements of the pistons 7 located at the axially outermost ends of said drums.

Figure 2:
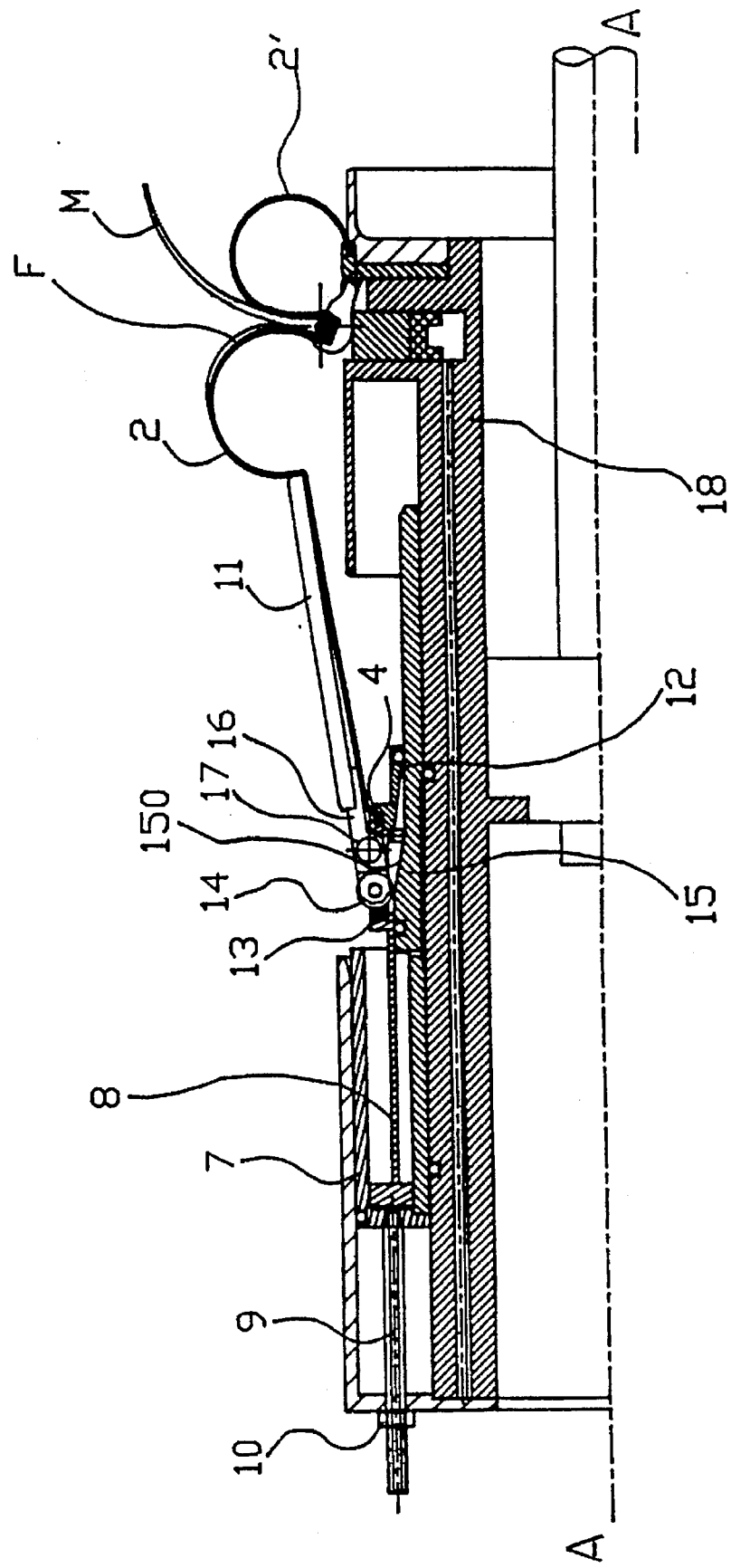
Figure 3:
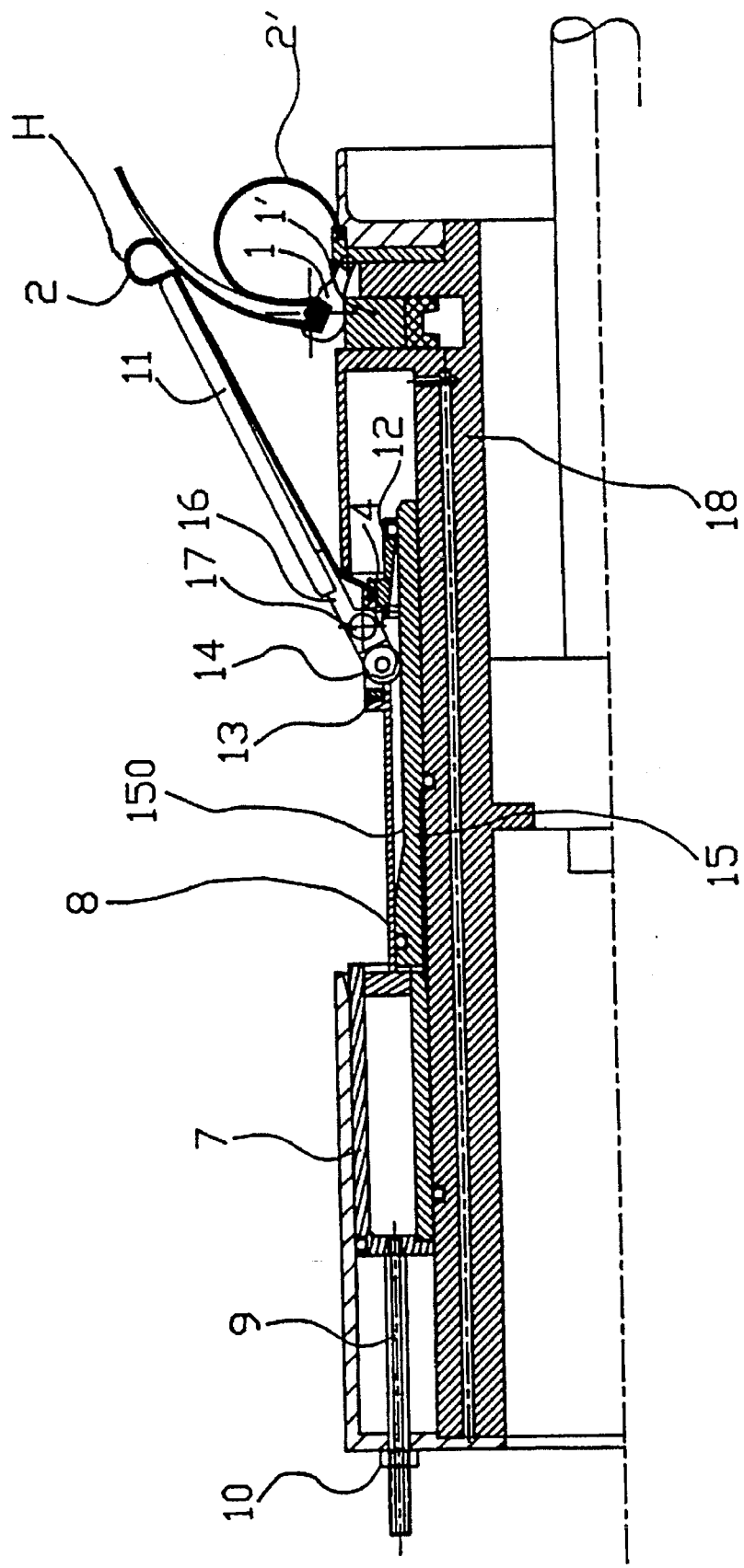

FIG. 2 shows a phase of manufacture of the tire corresponding to the formation of the beads. During this operation, the portion M of the sleeve located between the bead recesses 6 is expanded radially by placing it under internal pressure in order to obtain a toroidal shape of said portion M, while bringing the said recesses 6 axially towards each other; furthermore, the bladder 2' is inflated which makes it possible to exert a force the axial component of which is directed towards the outside on the portion of the sleeve which is in the vicinity of the bead and located axially to the inside thereof. At the same time, the bladder 2 is inflated so as to turn up the portion F of the sleeve axially to the outside of the bead recess 6; under the action of the same bladder 2, the pallets 11 open radially towards the outside while pivoting around the points of articulation 17 until placing the rollers 14 in contact with the ramp 150; in this position, the opening movement of the pallets 11 is blocked and therefore the shape of the useful surface of the bladder is perfectly determined. Thereupon, the piston 7 is displaced axially towards the inside which results in the displacement of the piston 8, of the ramp 150, and of the pallets 11 and thereby compels the useful portion of the bladder 2 to exert on the products to be turned-up a force the axial component of which opposes that exerted by the bladder 2' and is entirely sufficient to form the bead.

In the following phase (FIG. 3) of the construction of the sidewalls, the piston 8 is actuated, which axially displaces the ring 13 with respect to the ramp 150 and leads the rollers 14 to follow the profile of the ramp 150 so as to control the progressive opening in fan shape of the pallets 11 and their axial displacement; this action on the piston 8 has the effect of progressively modifying the shape of the useful surface of the turn-up bladder 2 and of permitting a good placement of the products of the sidewall of the tire.

It is important to note that the products or the part of the products to be turned up highest along the sidewall of the tire remain placed, during the greatest part of the operation, on opposite sides of the point H of the bladder 2 which is radially outermost; it is the overlap which results therefrom which prevents the said product from sliding with respect to the bladder 2; in this way, their position is perfectly controlled until their final placing on the sidewall, which makes it possible to respect the theoretical heights of said products on the tire.

It is, of course, possible, at any time, completely to deflate the bladder 2 so as to again have a quasi-cylindrical useful surface in order to be able to deposit thereon at least one other product having a base of non-vulcanized rubber and then repeat the turn-up operations previously described.

Figure 4:
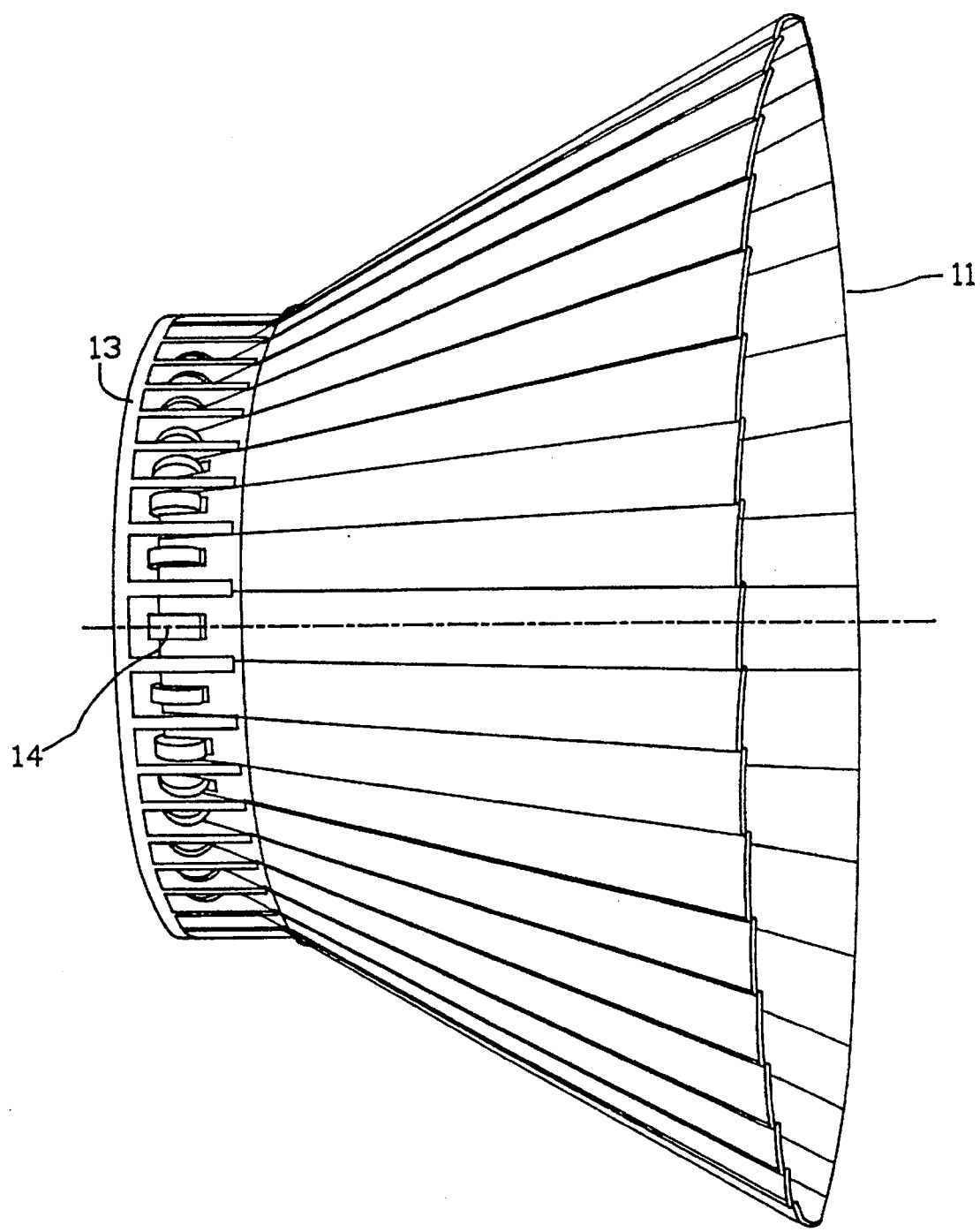
FIG. 4 shows, in perspective, a clamping means for the turn-up bladder.

For greater clarity, a perspective view of a ring 13 and of the pallets 11 opened in fan shape is given in FIG. 4. The fan-shaped opening of the pallets 11 takes place by relative sliding in the circumferential direction of the said pallets on each other, thus reducing the overlap of the pallets; in the case described, the dimensions of the pallets 11 are such that, even after complete opening, the said pallets still overlap so as perfectly to control the shape of the useful portion of the bladder 2.

FIGS. 5a, 5b, 5c, 5d and 5e show the successive phases of the manufacture of a tire using the turn-up process of the invention; the axis AA represents the axis of rotation of the building drum.

Figure 5A:
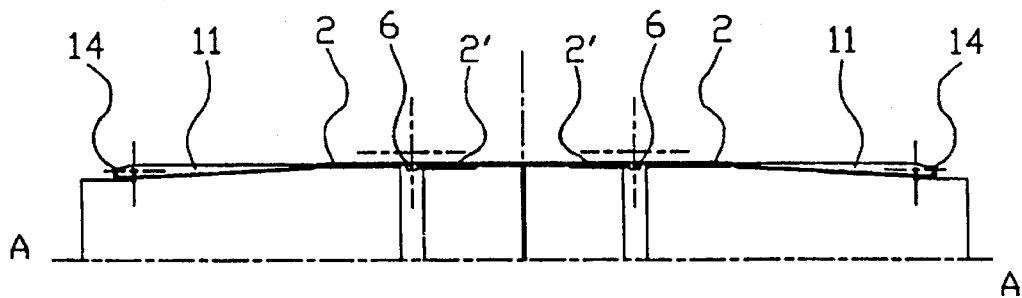
FIGS. 5a, 5b, 5c, 5d and 5e show, in axial section, the different phases of the manufacture of a tire produced in accordance with the invention.
Figure 5B:
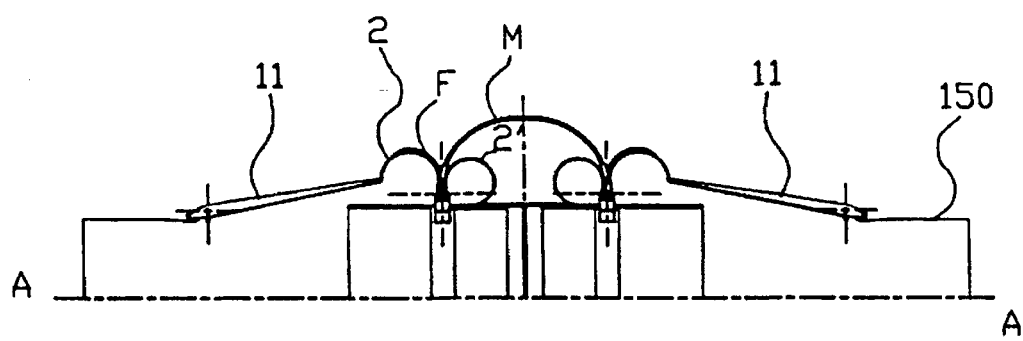

In these figures, the following details can be noted:

FIG. 5a: View in the initial state of the two building half drums before the production of a carcass sleeve on the outer walls of the bladders covering the drums;

FIG. 5b: After the building of the carcass sleeve and the putting in place of the bead wires on said sleeve, a first radial expansion of the sleeve is effected in order firmly to join the sleeve and bead wires; of course, at this stage, it is necessary that the sleeve have a bead reinforcement capable of containing this first expansion, the role of which is to assure a precise size for the length of the carcass cords finally defining the toroidal portion; this is the role of the bead wires.

Figure 5C:
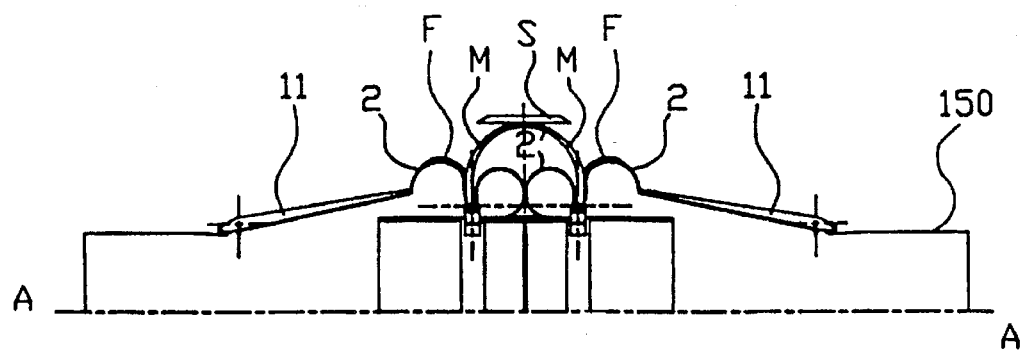
Figure 5D:
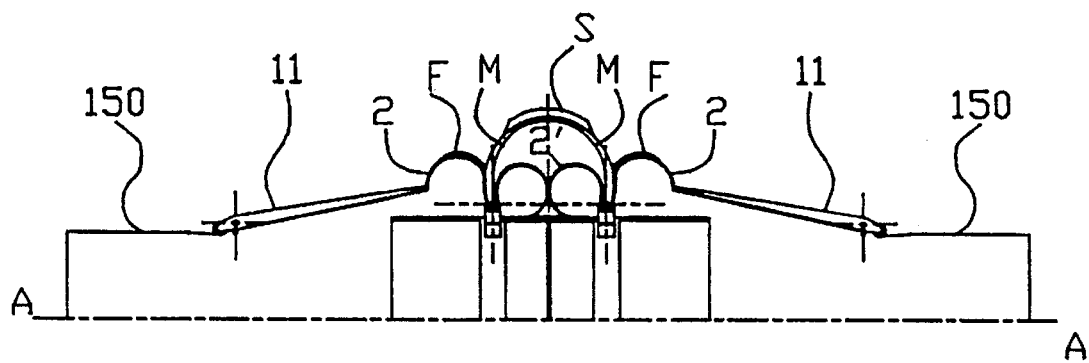
Figure 5E:
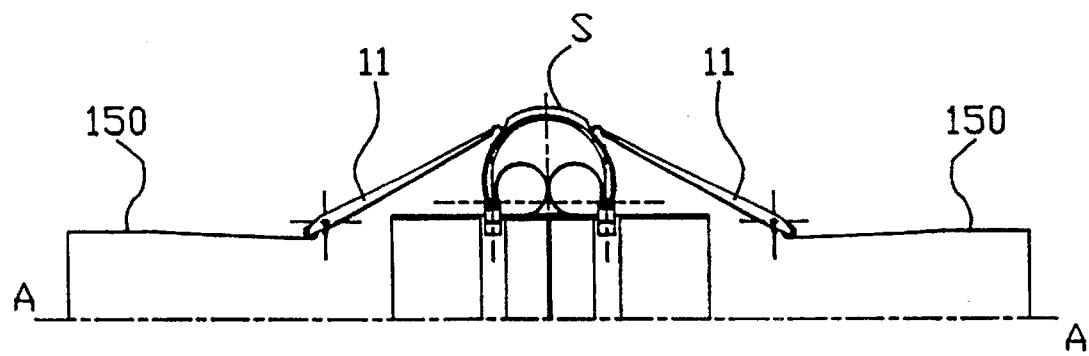

Thereupon, one proceeds with the axial bringing together of the bead recesses 6 and, at the same time, with the toroidal shaping by inflation of the portion M of the said sleeve located between the bead recesses 6, with the inflation of the bladders 2 and 2' located on opposite sides of the bead recesses; in this phase, the opening of the pallets 11 is limited to a fixed value which is predetermined as a function of the size of tire to be produced;

FIG. 5c: Completion of the axial bringing together of the bead recesses 6 and the formation of the beads by the axial bringing together of the pallets 11 thus producing an additional axial force on the beads; putting in place of the crown reinforcement S of the tire, and folding of the ends of the said reinforcement S over the portion M of the sleeve by suitable means, not shown here;

FIG. 5d: Start of the construction of the sidewalls by the turning-up of the products F positioned on the useful portion of said turn-up bladder 2, modifying the shape of said useful surfaces by the progressive opening of the pallets 11 and their axial movement together;

FIG. 5e: Completion of the construction of the sidewalls of the tire by complete rotation and axial displacement of the pallets 11.

Of course, the present invention is not limited solely to the case of a shaping drum on which a carcass sleeve is produced, but it applies also to the case of the shaping drum, employing the said invention, on which a carcass sleeve produced on another drum is centered.

Furthermore, the formation of the sidewalls by means of the invention can be effected either before or after the placement of the elements forming the crown of the tire on the central portion of the shaped carcass sleeve.

The invention also applies to any other shaping drum having in its central portion means different from those described above. In particular, the bladders 2' can be replaced by mechanical means formed of rigid elements permitting the formation of the beads, while the putting into toroidal shape of the portion of the carcass sleeve between the bead recesses is assured by mechanical means, possibly assisted by the action of air pressure. The portions of the drum which are outside the bead recesses, which is the object of the present invention, are retained.

I claim:

1. An apparatus for building a tire having reinforced beads by turning up a carcass sleeve on both the axially inner and axially outer sides of a bead wire comprising an annular turn-up bladder on which a carcass sleeve is placed for shaping, bead locking means for clamping the bladder and sleeve against a bead wire encircling the sleeve, means clamping an end of the bladder circumferentially and axially, leaving an unclamped turn-up portion of the bladder for turning-up the carcass sleeve located axially outwardly relative to the bead wire, means inflating the bladder to expand the carcass sleeve radially outwardly relative to the bead wire, means expanding the carcass sleeve located axially inside of the bead wire, the unclamped turn-up portion of the bladder forming an annular bulge of greater circumference than the clamped portion for turning up an end of the carcass sleeve, and means displacing the circumferential clamping means for the end of the bladder axially inwardly and radially outwardly during the inflation of the bladder while limiting the expansion of the clamped portion of the bladder.

2. An apparatus according to claim 1, in which the clamping means of the turn-up bladder includes an assembly of metal pallets which open in fan shape to limit expansion of the clamped portion of the bladder in the circumferential direction, while permitting expansion of the unclamped portion which turns up the carcass sleeve.

3. An apparatus according to claim 2, including a frame and a concentric ring on the frame and in which the pallets are connected to the ring which is movable axially with respect to said frame carrying the pallets with it.

4. An apparatus machine according to claim 3, in which each pallet is fastened on a lever which is movable around a point of articulation on the ring, the said lever being in contact with the profile of a cam.

5. An apparatus machine according to claim 4, in which the profile of each cam has on its radially outer face a ramp which is concentric to the frame.

6. An apparatus machine according to claim 5, in which the ring is movable axially with respect to the ramp and said ramp is movable axially with respect to the frame.

7. An apparatus machine according to claim 6, including a ring on which the outermost end of the bladder is fastened, said ring and the ring bearing the pallets being integral in their axial displacements.

8. An apparatus machine according to claim 7, in which the axial displacements of both rings are controlled by two concentric annular pistons and those of the ramp are controlled by one of the two pistons.

9. An apparatus machine according to claim 8, in which the movement of rotation of each pallet around its point of articulation produced by the inflation of the bladder axially to the outside of the bead is a function both of the axial displacements of the pallet bearing ring relative to the ramp and of the profile of the ramp on which the points of contact of the levers move.

10. An apparatus machine according to claim 9, in which the turn-up bladder has reinforcement elements disposed along the meridian direction.

11. An apparatus for building a tire having reinforced beads by turning up a carcass sleeve on both the axially inner and axially outer sides of a bead wire comprising an annular turn-up bladder on which a carcass sleeve is placed for shaping, means clamping an end of the bladder circumferentially and axially, leaving an unclamped turn-up portion of the bladder for turning-up the carcass sleeve, bead locking means intermediate opposite ends of the bladder for clamping the bladder and sleeve against a bead wire encircling the sleeve, thereby dividing the annular, unclamped portion of the bladder into axially inner and outer portions, means inflating the inner and outer portions of the bladder to expand the carcass sleeve radially outwardly relative to the bead wire, the inner portion of the bladder imparting an axially and radially outward displacement to the carcass sleeve and the unclamped outer portion of the bladder forming an annular bulge of greater circumference than the clamped portion for turning up an end of the carcass sleeve, and means displacing the circumferential clamping means for the end of the bladder axially inwardly and radially outwardly during the inflation of the bladder while limiting the expansion of the clamped portion of the bladder to an expanding conical shape.

* * * * *

UNITED STATES PATENT AND TRADEMARK OFFICE
CERTIFICATE OF CORRECTION

PATENT NO. : 5,660,677
DATED : Aug. 26, 1997
INVENTOR(S) : Remond

It is certified that error appears in the above-indentified patent and that said Letters Patent is hereby corrected as shown below:

Col. 8, lines 46, 50, 53, 56, 60 and 64, AND Col. 9, line 4,

"apparatus machine" should read --apparatus--.

Signed and Sealed this

Twenty-seventh Day of January, 1998

Attest:

BRUCE LEHMAN

Attesting Officer

Commissioner of Patents and Trademarks